Sept. 30, 1969   SHIGERU NAKAHARA ET AL   3,469,887
APPARATUS FOR BRANCHING OFF FLOATING ARTICLES
Filed April 24, 1967   5 Sheets-Sheet 1
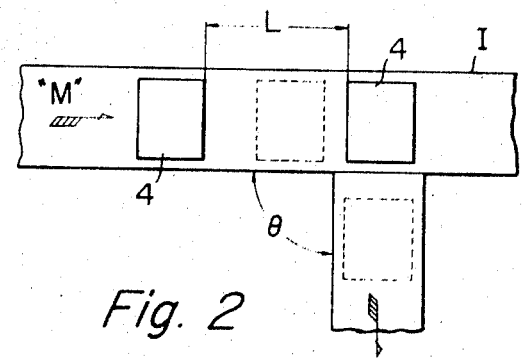
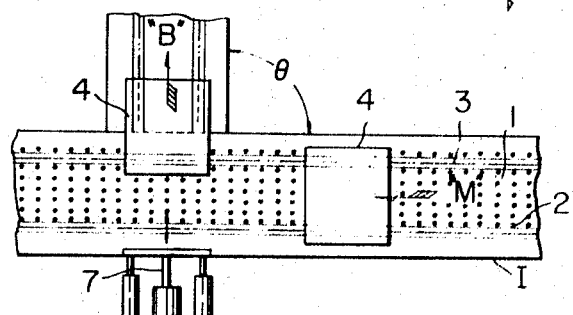
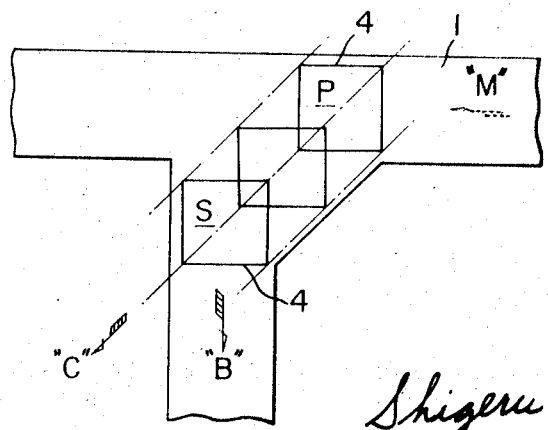
Shigeru Nakahara
and Yoichi Toyoda.
INVENTORS
BY Wenderoth, Lind
and Ponack,
attorneys Sept. 30, 1969    SHIGERU NAKAHARA ET AL    3,469,887
APPARATUS FOR BRANCHING OFF FLOATING ARTICLES
Filed April 24, 1967                            5 Sheets-Sheet 5

Shigeru Nakahara
and Yoichi Toyoda.
INVENTORS
BY Wenderoth, Lind
and Ponack.
ATTORNEYS United States Patent Office 3,469,887
Patented Sept. 30, 1969

3,469,887
APPARATUS FOR BRANCHING OFF
FLOATING ARTICLES
Shigeru Nakahara, Tokyo, and Yoichi Toyoda, Yokohama-shi, Japan, assignors to The Tsubakimoto Chain Mfg. Co., Ltd., Joto-ku, Osaka-shi, Japan, and Asahi Glass Co., Ltd., Marunouchi, Chiyoda-ku, Tokyo, Japan
Filed Apr. 24, 1967, Ser. No. 633,123
Claims priority, application Japan, Apr. 30, 1966, 41/27,391
Int. Cl. B65g 53/06
U.S. Cl. 302—29          2 Claims

ABSTRACT OF THE DISCLOSURE

This invention relates to apparatus for branching off floatingly supported articles such as flat plates in a pressurized fluid or air cushion type conveyor, and includes a main transporting path for transporting a flat plate therealong, a sub-transporting path crossing the main path at a given angle $\theta$ and a positive advancing mechanism for pushing the plate onto the branch path at a branching portion.

Background of the invention

This invention relates to an apparatus for branching off floatingly supported articles and, more particularly to an air cushion type conveyor apparatus including means for branching off or transferring articles supported by a fluidized or gas pressure into a sub-transporting path intersecting at a certain angle with a main transporting path thereof.

Heretofore, when loads are branched off from the main transporting path, which may be composed of various types of conveyors, to the sub-transporting path in the direction of crossing the main path, the loads must be stopped once at the branching portion at every branching operation so that the leading edge of the following load doesn't interfere with the back of the leading load; and if the load happens to slip or shift on the conveyor responsive to the intertia of the load, scratches are produced depending upon the nature, size, etc. And, when the loads are sufficiently spaced on the main path so as not to collide with each other, the capacity of the transportation decreases per unit time to lower the efficiency of the transportation.

Summary of invention

This invention overcomes the aforesaid disadvantages by providing for branching off pressurized fluid supported loads on the conveyor by the provision of a direct or positive advancing mechanism for branching off the loads at a branching station by means of plates floated by gas pressure on various transporting paths as will be described, thereby automatically branching off the desired loads on the path without any interference each other.

Therefore, one object of this invention is to provide an improved conveyor apparatus for branching off the articles wherein no interference of the loads occurs with each other.

Another object of this invention is to provide improved apparatus for smoothly branching off the articles.

A still further object of this invention is to provide an improved apparatus for branching off even heavier loads smoothly without the load incurring any scratches.

Still another object of this invention is to provide an improved apparatus for branching off the articles wherein the loads are automatically branched off safely and positively.

A further object of this invention is to provide an apparatus for branching off the loads so as to move forward or backward the surface of the conveyor by an instruction.

Other objects and advantages of this invention will become apparent hereinafter from reading of the specification in connection with the drawings.

Brief description of the drawings

FIGURE 1 is a diagrammatic fragmentary plan view of a conveyor including a main path and a sub-path for branching off plates on the conveyor;

FIGURE 2 is a fragmentary diagrammatic plan view of one embodiment showing paths with a direct or positive advancing mechanism and a roller conveyor, respectively for branching off the plates;

FIGURE 3 is a fragmentary diagrammatic plan view of another embodiment of this invention showing a path for branching off plates;

Description of the preferred embodiment

Figure 4:
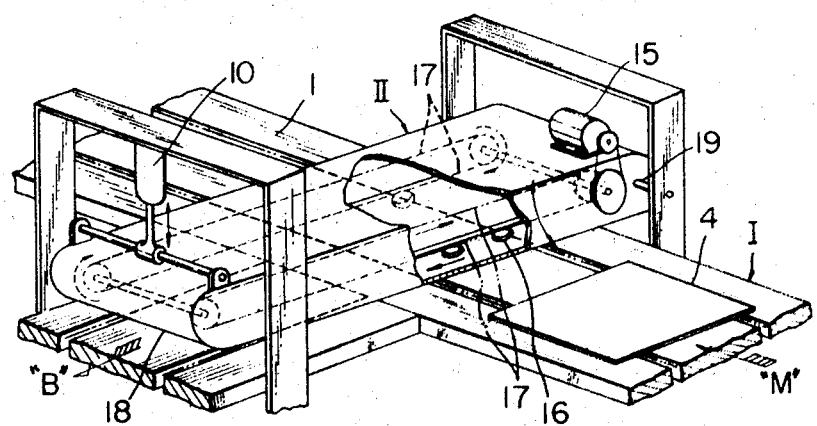
FIGURE 4 is a schematic perspective view of an alternative embodiment showing an apparatus for branching off the plates.

Several specific forms of the invention have been selected for illustration in the drawings, and the following description is drawn in specific terms for the purpose of describing those illustrative forms of the invention.

Referring to the drawings, and particularly to FIGURE 1, a diagrammatic plan view of a path for branching off plates on the conveyor is shown. A main transporting path M may be composed of various types of conveyors and a sub-transporting path B is illustrative of a branching path disposed at an angle $\theta$ with the main path. When an article 4 being transported along the main path is branched off onto the sub-path B, it slips relative to the main path of a gas conveyor by intertia of the article, assuming that the load is to be stopped for a while during transferring at the branching portion on the conveyor so as not to cause interference between the rear end of another leading article 4 or the front end of the following article 4. Scratches generally occur on the bottom surface of the load depending on the nature and size of the load 4. And, if the distance L between the leading and the following load on the main path is disposed at a sufficient space so as to preclude colliding with each other, the capacity of the transportation per unit time is reduced.

According to this invention, the plate is floated on the main path by means of pressurized gas and the loads are transferred in the same direction on the gas cushion type conveyor so that any plate is branched off into the sub-path at an angle $\theta$ with and from the main path, said branching being automatically and selectively done without any interference between the adjacently following plates.

Referring now to FIGURE 2, a plurality of gas jet holes or openings 2 for injecting pressurized gas are provided on a sliding surface 1 at the conveyor I on the main path M so that the articles or plates 4 to be transferred are transported along the main path by means of two series of chains 3, disposed at the right and left of the conveyor. The plates are transported by the chains 3 in the direction of the main path M with the surface of the conveyor I being frictionally contacted with the bottom surface of the plates which are floated by the pressurized gas on the conveyor. The direction of travel of the load is illustrated by an arrow in the drawings.

As has been described heretofore, the selective branching of the load 4, from along the main conveyor into the sub-path B is done, for example, as shown in FIGURE 2, so that the load transferred at the branching portion on the main path is positively pressed toward the branching direction by means of a push rod 7 connected with an air cylinder 5.

Also, as shown in FIGURE 3, when the plate 4 reaches to the position P to be branched off from the main path M to the sub-path B, the plate 4 may be parallelly or laterally transferred in the direction designated by reference character C in the drawing and the branching operation may be stopped when the plate 4 reaches the position S. Although not shown, some of the gas jet holes provided on the sliding surface 1 may be formed in the angularly disposed portion leading to the direction of the sub-path and these latter holes eject branching gas at the desired time by a predetermined signal to branch off the load.

An embodiment shown in FIGURE 4 is an alternative branching apparatus using another independent conveyor II which is disposed at a suitable space above the sliding surface of said conveyor I. Two endless chains 17 are hung on a series of rail frames 18 in this apparatus, and resilient pads 16 mounted at several positions on and along the whole length of the chain 17 so as to resiliently contact the upper surface of the plate 4 are also provided therewith. A reduction motor 15 is a power source to drive chain 17 along the branching direction of the sub-path B.

Figure 5:
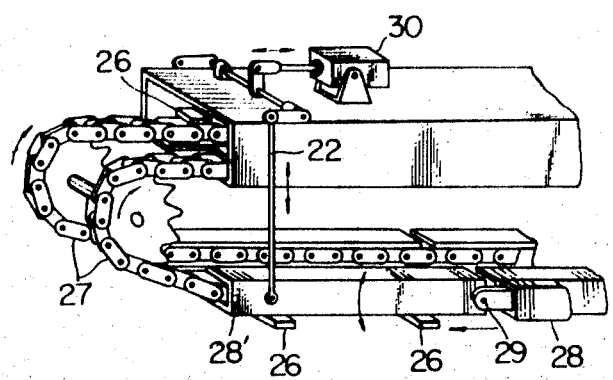
FIGURE 5 is a perspective detal view of a rail frame as used in FIGURE 4.

Referring next to FIGURE 5, the frame 18 is adapted to be separated at the end 28' of the sub-path side from the intersection of the conveyors I and II of the branching portion and in response to such a requirement it is pivotally supported at a pivot shaft 29. This frame is engaged through linkage 22 to a gas cylinder 30 and the lower run of a chain 27 is vertically moved by moving vertically this linkage so that the bottom surface of the pads 26 is selectively movable toward or away from the plate 4 on the sliding surface, and the equivalent or corresponding frame is also similarly engaged to opposite ends of frame 18 of the conveyor II. The gas cylinder 30 operates to lower the end 28' of the frame so as to lower automatically the pad 26 when the load 4 is branched off from the main path to the sub-path.

The operation of the branching will be hereinafter explained. The plate 4 is transported along the main conveying path M by means of the conveyor I, and just before the plate 4 reaches the branching station C the chain 27 commences to rotate so that the pads 26 as engaged with the chain 27 are subsequently located above the conveyor I responsive to actuation of means such as a conventional limit switch (not shown) by a signal warning users to be ready to expect the next load.

When the branching operation is necessary a limit switch (not shown) is operated so that when the load 4 is disposed right above the frame 28', the frame is pivotally moved to rotate about pivot shaft 29, and the bottom surface of the pad 26 depending from the chain 27 comes into contact with the upper surface of the load 4, thereby branching the load 4 into the sub-path upon the rotation of the chain. In this case by suitably controlling the operating pressure of the gas cylinder 30, the pressure of the pads is adjusted so that the load is effectively branched off depending upon the load itself and the angle between the conveyors I and II.

Instead of aforesaid chain 27 a belt may be utilized and, further, if the load is light or small there is no need for the end of the frame 28 to be separated or pivotally moved up and down, the use of the elastic pad is sufficient to effectively branch the load off. Further, the number of the chain may be reduced to effect the same as above.

Figure 6:
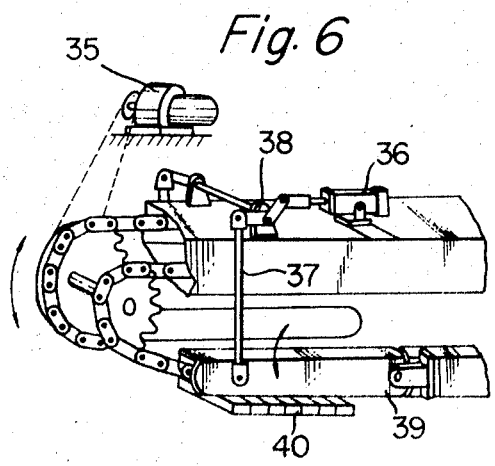
FIGURE 6 is a schematic perspective view of an alternative embodiment similar to that shown in FIGURE 5.

In FIGURE 6, the pad elevating device shown in FIGURE 5 is illustrated in further detail. This pad elevating device or rail elevating device comprises a gas cylinder 36, link lever 37, bell crack lever 38, elevating frame or elevating rail 39 and pads 40, and particularly in the embodiment of this application it comprises one gas cylinder and two of other components respectively. This gas cylinder is adapted to engage with the respective rail elevating devices so as to lower and raise them. The pads 40 normally move with the rail elevating device so that when the load such as glass plate or a like is transported along the main path and the load to be branched off passes the branching portion, the gas cylinder operates responsive to a predetermined signal so as to lower both the connecting rods 38 through link lever 37 so that both ends of elevating rail are lowered, which thereby lower the pads mounted on the chains driven in the rail resulting in the load being branched off from the main path into the sub path by the chains driven frictionally contacting with the upper surface of the load. When the branching of the load is completed, the cylinder operates to again raise the elevating rail 39 so as to be prepared to receive the next branching instruction.

This rail elevating device may be provided at both the front and rear end of the branching apparatus along the line of the sub-path, with both sides of the device being operable in synchronization with each other to effect positive branching operation.

Figure 7:
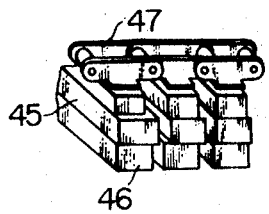
FIGURE 7 is a fragmentary perspective enlarged view of the pads as briefly shown in FIGURE 5.
Figure 8:
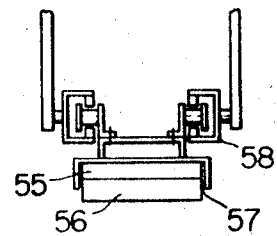
FIGURE 8 is an end view of pad supported by the rail shown in FIGURE 7.

Referring to FIGURES 7 and 8, a pad supporting device is shown, which comprises a metal pad support fitting 45, pad 46 and chain 47. The pad support fitting 45 is suitably connected to the chain as by bolts. The pad 46 is composed of material such as urethane foam 55 and cellular sponge 56 to bind each other. When this pad contacts the load it absorbs and error of a height of a facing surface and makes the contacting pressure even or uniform. The pads are installed at a predetermined distance so that when the pad is pressed to expand at the respective sides, the spaces or voids therewithin may receive the expansions of the pads. Chains 47 are engaged slidably with rails 58.

Figure 9:
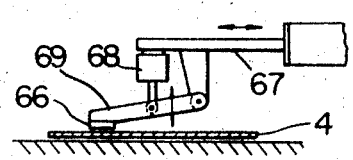
FIGURE 9 is a diagrammatic side view of alternative positive advancing mechanism somewhat analogous to that shown in FIGURE 2.

In FIGURE 9, an alternative of this invention includes a pad 66 which may be connected to the tip of an arm 69 further connected to a magnet 68 mounted at the end of push rod 67 corresponding to push rod 7 shown in FIGURE 2. In this case if the component speed of the conveyor I along the transferring direction is the same as that of conveyor II with respect to the conveyor I, an inertia of a load moving in the direction of conveyor I is completely transferred to the direction of conveyor II. Smooth branching may be done without interferring the load to be branched off with other successively transferred loads ahead and aft on the main path, and when the branching is automatically controlled a continuous branching off may be made.

Figure 10:
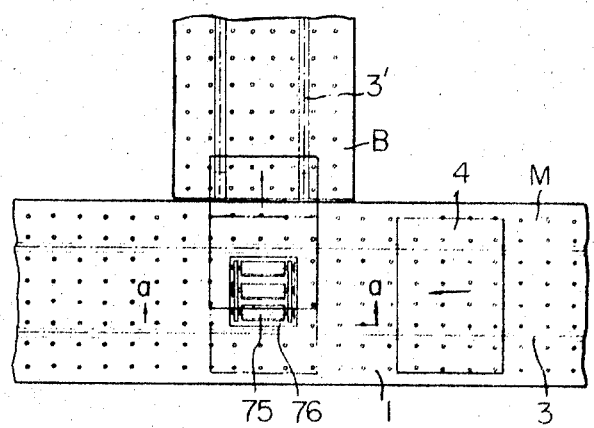
FIGURES 10 to 12 are fragmentary plans, front and side views, respectively of an alternative showing an apparatus for branching the plates.
Figure 11:
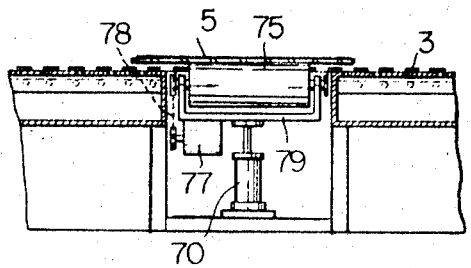
Figure 12:
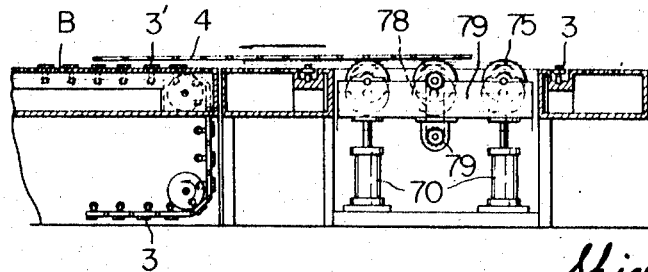

In the embodiments of FIGURES 10 and 12, a notch portion or opening 76 is provided at the branching station of the main conveyor I on the main path M, and within which opening a pluarity of feed rolls 75 are mounted on a supporting base or frame 79 vertically movable by means of a cylinder and piston assembly 70 disposed therebeneath as shown in the drawing figure. The rolls may be rotatably driven through chain 78 by a motor 77. The rolls 75 are normally expected to be positioned so that their upper surfaces are below the bottom surface of the load 4 on the gas table or endless conveyor I. When the load 4 to be branched off is transferred just above the rolls 75 by means of the endless conveyor I, a gas cylinder of the assembly 70 operates to raise the rolls so that the rolls contact with the base carrying the bottom surface of the load floated by the pressurized gas on the gas table, thereby lifting further the load 4 so as to isolate the engagement with the conveyor I. The load 4 floated by the pressurized gas and partly supported by the endless conveyor I is substantially transferred to the feed roll 75 at this time, whereupon the rolls 75 rotate by means of the motor 77 almost simultaneously with the contacting of the load by the rolls. The rolls, if desired, may be rotating at all times so that the load is branched off into the sub conveyor on the sub-path B. When the load is being transferred to the sub-conveyor by means of the feed rolls 75, the leading end of the load toward the sub path to some degree is floated on the gas table of the sub-conveyor II and this load is also partially supported by the endless conveyor 3' mounted on the sub-conveyor II so that the load is completely transferred to the sub-conveyor to finish the branching.

Figure 13:
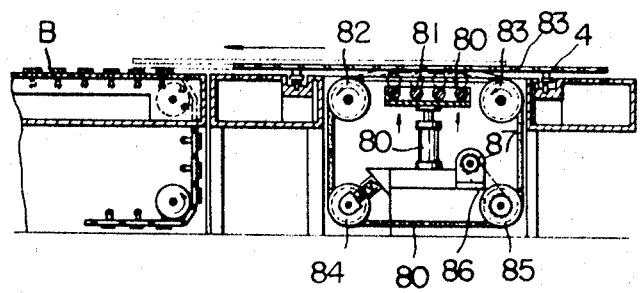
FIGURE 13 is a side view of still another alternative of the positive branching means of this invention.

In FIGURE 13, another embodiment of the branching apparatus is shown, in which open or notch portion of the main conveyor I one or more rows of endless belt 80 are mounted rotatably in the branching direction to the sub-conveyor II as shown in the drawing. When the load 4 is disposed just above the belts, it is lifted by means of the rotatable rollers 81 via a gas cylinder 80 or by other electric means or the like so that the belts 80, isolated heretofore from the load, move into contact with the bottom surface of the load 4, whereupon one pulley 85 of the belts 80 is rotated through chains 86 by a motor 87 so as to effectively branch the load into the sub-conveyor II. This pulley 84 is resiliently supported so as to always apply tension to the belts.

Figure 14:
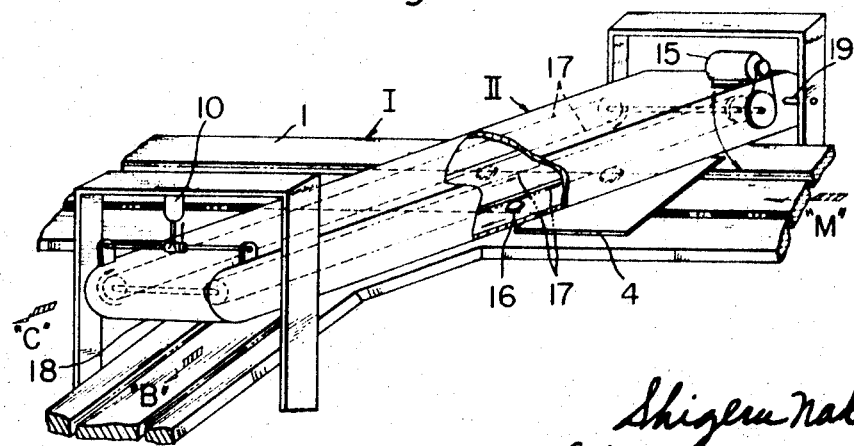
FIGURE 14 is a fragmentary perspective view of an alternative embodiment showing branching means.

In FIGURE 14, an alternative embodiment provided by the branching operation shown in FIGURE 3 as referred to in the preceding description is shown. In the apparatus another independent conveyor II transfers the plate 4 in the direction designated by reference character C diagonally crossed to the main path M and sub-path B so that the plate 4 is branched off from the main path M to the sub-path B.

In accordance with the above explanation of this invention, the load which may include flat plates is effectively branched off from the main conveyor I mounted on the main transporting path to the sub-conveyor II provided on the sub transporting path so that the load is automatically branched off by means of signaling or instructing mechanism such as the conventional electric limit switches or electric photocells or the like means.

What is claimed is:

1. Conveyor apparatus for branching off particles such as flat plates which are flotatable on a gas cushion of the conveyor comprising means defining a main path adapted to carry flat plates thereon, means defining a sub-path crossing said main path at any predetermined angle, a gas table including means to support said plates by pressurized gas floating condition disposed at the portion at which said paths cross, and branching device means for branching off the flat plates from the main path to the sub-path, said branching device means including a rail frame mounted a proper height on the gas table toward the branching direction, a moving conveyor chain supported by said rail frame and having a plurality of resilient pads projecting toward the gas table, means enabling said pads to selectively contact with the flat plate floatedly supported on said gas table, and means to activate branching of them to said sub-path, said sub-conveyor including means being mounted diagonally with respect to each of said main and sub-paths on the conveying surface of the branching portion, and means whereby said flat plates carried on said main path at constant speed are smoothly branched off to said sub-path by the effect of the cooperation of said sub-conveyor.

2. An apparatus for branching off floated articles such as flat plates which are flotatable on a gas cushion conveyor comprising means defining a main transportation path incorporating a first conveyor adapted to carry flat plates thereon, means defining a sub-transportation path joining with an intermediate part of one side of said main path to constitute a branching portion at any predetermined angle and incorporating a second conveyor therein, a gas table including means to support said plates by pressurized gas in floating condition disposed at the branching portion where said paths join, and branching device means provided above said gas table for branching off the plates from the main path to the subpath, said means including a conveyor rail frame mounted at a predetermined height above the gas table toward the branching direction, a moving endless conveyor chain mounted in said rail frame and having a plurality of resilient pads projecting toward the gas table, means enabling said rail frame to move downward and upward relative to said gas table to enable said pads to selectively contact with the plates floatedly supported on said table while said plates are moving along said main path, whereby selected ones of said flat plates are branched off from said main path to said sub-path, and means to activate branching of them to said sub-path.

References Cited

UNITED STATES PATENTS

| 2,264,818 | 12/1941 | Wilcox et al. | 198—31 |
| 2,984,364 | 5/1961 | Lamb. | |
| 2,017,535 | 10/1935 | Hammer | 198—81 X |
| 3,052,339 | 9/1962 | Carter | 214—1 |
| 3,265,186 | 8/1966 | Burton | 198—78 |

ANDRES H. NIELSEN, Primary Examiner

U.S. Cl. X.R.

214—1; 302—31